United States Patent Office 3,331,898
Patented July 18, 1967

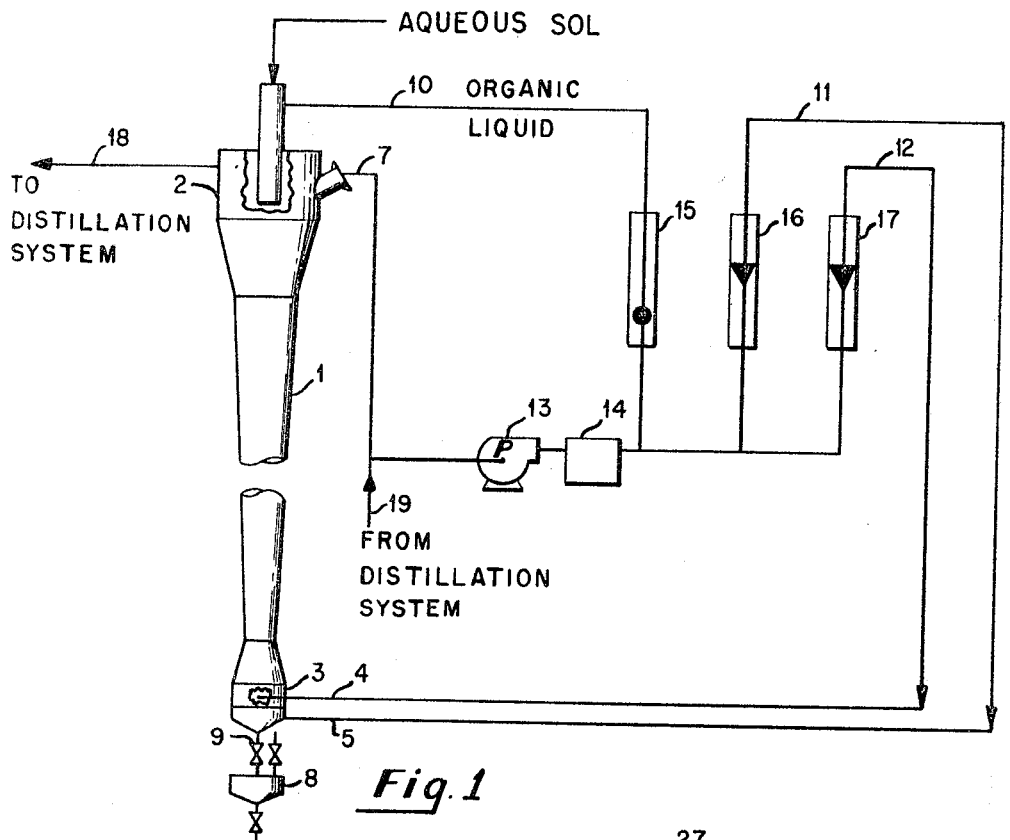
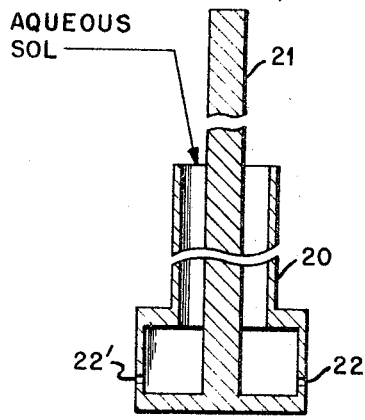
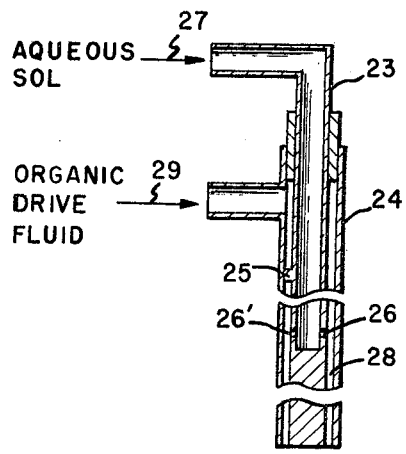

3,331,898
METHOD FOR PREPARING METAL OXIDE MICROSPHERES
Paul A. Haas, Knoxville, and Sam D. Clinton, Oak Ridge, Tenn., assignors to the United States of America as represented by the United States Atomic Energy Commission
Filed Oct. 23, 1965, Ser. No. 504,267
3 Claims. (Cl. 264—.5)

ABSTRACT OF THE DISCLOSURE

Gel microspheres selected from urania, thoria, plutonia and zirconia are prepared by an improved process wherein an aqueous sol stream of said compounds is formed into sol droplets of from 200–500 microns in size by passing the sol stream into an organic drying liquid stream at an angle to its direction of flow to effect a high shearing force on said sol and droplet formation.

---

This invention relates to an improved method for preparing metal oxide microspheres from aqueous sols. The invention described herein was made in the course of, or under, a contract with the U.S. Atomic Energy Commission Preparation of high density oxide microspheres for reactor fuel applications by the sol-gel process has been widely demonstrated. Broadly, the process encompassed dispersing sol droplets into a drying liquid to effect gelation of the sol droplets to gel microspheres with subsequent calcination of the gel microspheres to dense oxide microspheres. In carrying out such a process it has been found beneficial to effect droplets formation by employing a two-fluid nozzle in which the sol is introduced in the center of a drying liquid stream which acts as the drive-fluid. With such an arrangement, the continuous sol flow is accelerated to the drive fluid velocity and then breaks up by a varicose mechanism to give sol droplets of a uniform size and nature. While processes using a two-fluid nozzle in a sphere-forming column have been highly successful in preparing product microspheres of a highly uniform character, attempts to scale the process up to capacities presently contemplated for routine continuous production runs, e.g. up to 100 cc./min., have not been too successful. This has generally been attributable to the fact that the maximum sol flow rate which can be obtained by a single nozzle without seriously impairing the size distribution of product is limited to about 5 cc./min. This is seen from the fact that in order to form uniformly sized droplets the drive-fluid must be laminar. Accordingly, while larger capacities may be obtained by employing multiple-nozzle units in parallel, the laminar-flow restriction greatly hampers the scale-up of such units. Moreover, it has been found that with multiple-nozzle units, the respective nozzles cannot be fed from a common sol source, requiring an accurately metered, non-pulsating sol flow for each nozzle. It may be readily seen that it would be highly beneficial to provide a process which is amenable to scale-up to the large capacities contemplated and which eliminates the rigid and exacting process operations required of prior processes, affording a high degree of process flexibility.

With these difficulties in mind, it is a general object of this invention to provide an improved process for preparing gel microspheres from sols.

Another object is to provide a sol-gel process which is amenable to large-scale production capacities contemplated for routine continuous operation.

The present invention calls for injecting at a controlled rate a sol through one or more inlet orifices into an organic drying liquid stream at an angle to the direction of flow of the organic stream. The emerging sol, by this arrangement, is subjected to a high shearing force created by a velocity gradient maintained in the drying liquid at the orifice and is sheared off into uniform sol droplets. Scale-up above 10 cc./min. and as high as 100 cc./min. may be easily attained without any sacrifice of uniformity of product microspheres. Moreover, the process may be operated continuous or batchwise to prepare fuel oxide microspheres having a mean particle diameter between 50–1000 microns of high strength and near theoretical density for reactor use.

The present invention may be readily understood by reference to the drawings illustrating embodiments of the same. FIGURE 1 illustrates an over-all system (excluding the distillation system) incorporating a sphere-forming column which is employed in the preparation of metal oxide microspheres in accordance with this process. FIGURES 2 and 3 illustrate preferred alternate embodiments of a sol dispersing head of the present invention.

Referring specifically to FIGURE 1, tapered column 1, which generally tapers inwardly from the top, comprises a cylindrical disengagement chamber 2 at the top and an enlarged chamber 3 at its bottom end. Inlet conduits 4 and 5 connect to chamber 3 for passage of an organic liquid upward through the column and outwardly through overflow line 7. In a preferred embodiment organic liquid is passed tangentially into chamber 3 through conduit 4 and radially through conduit 5. A product collecting chamber 8 which communicates with chamber 3 through valved line 9 is provided at the bottom of the chamber 1 for product removal. The organic liquid effluent is removed from column 1 through line 7 and the bulk of the liquid recycled to feed lines 10, 11, and 12 by means of pump 13. A filter 14 is provided in the recirculation line 14 and flow meters 15, 16, 17 are provided to regulate the respective organic flows into the column. A portion of the organic liquid is passed through line 18 to distillation equipment (not shown) and returned to the system through line 19.

Referring now to FIGURE 2 there is shown an enlarged sectional view of a sol dispersing head. A T-shaped housing 20 is adapted to be rotatably mounted at the top of chamber 1 with its lower extremity extending downwardly into the organic liquid. A variable speed motor (not shown) is connected to the free end of axial shaft 21 which is made integral to housing 20. Housing 20 is provided with a plurality of radially-spaced small diameter holes 22, 22', . . ., in the surface of maximum outside diameter and is adapted to receive an aqueous sol which is fed into the housing and out through the small diameter holes. With respect to the size of the orifices employed, it will be appreciated that as the orifice diameter decreases, all other parameters being the same, the resulting diameter of the sol droplets will be correspondingly smaller. Typical orifice diameters, which may be employed may range from 0.010 to 0.016 inch and are especially useful in preparing calcined oxide microspheres of 150–700 microns. Moreover, the spatial relationship, as well as the number of orifices, is not critical and configurations of eight equally-spaced orifices have been found to be quite satisfactory.

An alternate embodiment of the dispersing head shown in FIGURE 2 is depicted in FIGURE 3. A center tube 23 is axially disposed within an outer tubular member 24 in spaced-relationship thereto by three spacing fins 25 (one shown). Tubular member 24 is in turn mounted at the top end of column 1 with its lower extremity extending downwardly into the organic liquid. A plurality of small diameter equally spaced holes 26, 26', . . ., are provided in the walls of center tube 23 immediately above the terminal end of the tube. While the spatial relationship and number of orifices are not critical, eight radially-spaced small diameter orifices having a diameter between 0.010 and 0.016 inch are satisfactory. Aqueous sol is introduced through a suitable line 27 into center tube 23 and is caused to flow out the radially-spaced holes into an annulus 28 formed with the outer tubular member 24; organic liquid is introduced concurrent therewith through suitable line 29 into annulus 28 and out into the disengagement chamber 2 of column 1. Thus, the emerging sol stream, as it leaves the small diameter orifices, is sheared off into small sol droplets and carried by the flowing organic stream into the disengagement chamber.

In carrying out the operation of this invention, an aqueous sol which may comprise any conventional stable metal oxide sol such as urania, thoria, plutonia, zirconia, and mixtures thereof, is introduced into the sol dispersing head and out through the small diameter orifices into the organic liquid. Where, for example, the rotary sol dispersing head shown in FIGURE 2 is employed, the aqueous sol is pumped into the annulus provided in housing 20. The level of sol inside the disperser is allowed to vary so that the centrifugal force plus gravity head equals the hydrostatic head of the organic liquid outside the disperser plus the pressure drop required for the sol to flow through the orifices. While the shear which occurs in the organic liquid at the surface of the rotary disperser is a complex function of a number of variables, it is believed that the centrifugal force on the emerging sol has only a minimal effect on the mechanism for sol droplet formation.

While there has not been a correlation established between such process variables as sol and organic flow rates, orifice diameter, rotational speed of disperser, column configuration, or organic liquid properties, the sol drop size appears, over the range of from 200–500 micron gel microspheres, to be independent of the sol flow rate for a given orifice diameter and disperser rotational speed. For example, gel microspheres having an average particle diameter from 200–300 microns have been prepared by employing a disperser comprising eight radially-spaced orifices (0.010 in. diameter) and an aqueous sol flow rate of 15 cc./min. For this the rotational speed of the disperser, which conveniently is measured as the tangential speed at the orifice, was set at from 1–2 ft./sec. Sol flow rates as low as about 10 cc./min. and as high as about 25 cc./min. did not appear to appreciably affect the uniformity of the resulting gel microspheres. On the other hand, gel microspheres having an average particle diameter from 400–500 microns have been prepared employing a rotary disperser having eight radially-spaced (0.016 in. diameter) orifices with sol flow rates of 15 cc./min. and tangential speed of from 1–2 ft./sec. Gel microspheres of about 700 microns have been prepared with this disperser by slowing the tangential speed down to 0.7 ft./sec. While it will be apparent that gel microspheres having an average particle diameter of less than 200 microns may be prepared by the present process, uniformity of product becomes much more difficult to reproduce.

Where, for example, the alternate disperser as shown in FIGURE 3 is employed, the size of the resulting gel microspheres appears to be more sensitive to the sol and organic flow rates. It should be apparent here that, the shearing mechanism by which sol droplet formation is effected with this type dispenser, is created by a velocity gradient being established immediately adjacent to the orifices by the flowing organic stream. Hence, as the sol emerges at an angle to the flowing organic stream, it is sheared off into uniform sol droplets. This should be compared with the rotary disperser shown in FIGURE 2 wherein the shearing mechanism is created by establishing a velocity gradient in the stagnant organic liquid by the rotational movement of the disperser head. Thus the organic liquid immediately adjacent to the orifices is accelerated to approximately the same speed as the disperser head, with it progressively dying out as it moves from the immediate vicinity of the rotating disperser head. In any event it will be apparent that the same mechanism for effecting sol droplet formation is present in either of the two embodiments—that is one of shearing off the sol stream as it emerges at an angle to the direction of the flowing organic stream into uniform sol droplets.

After the sol is dispersed into droplets, they fall through the organic liquid until they reach their fluidizing velocity, and set to rigid gel microspheres as water is extracted from the aqueous droplets into the organic phase. There, the denser gelled microspheres, requiring a higher fluidizing velocity, move down the column and collect at the bottom. To effect this differential density classification, the organic liquid previously was introduced perpendicularly at the bottom of the column and passed up through the column. Where the column was to operate on a continuous basis the process was generally limited to column diameters of about 0.5 inch. Applicants have found that by introducing the organic liquid tangentially into a diametrically enlarged section at the bottom of the column these difficulties may be overcome. With respect to this improvement as shown in FIGURE 1 there may be provided both tangential and radial inlets. Thus, the relative magnitude of the vertical and horizontal flow components of the upflowing organic liquid may be adjusted for optimum performance by varying the relative flows through the respective inlets. The rotary action of the organic liquid, which extends with decreasing intensity from one to three feet up the column, prevents the accumulation of particles in the peripheral region and greatly reduces the amount of axial mixing so that the ungelled sol droplets remained in the upper half of the column, permitting only gelled microspheres to drop out of the fluidized zone. With respect to the apportionment of the organic liquid between the two inlets, it is preferred that the major portion of the organic liquid be passed tangentially with the axial flow being set to compliment or optimize the total flow required for fluidization. With a 0.188 in. diameter orifice in the tangential inlet line, the percentage of the total fluidizing flow through the tangential inlet varied from 100 to 35% for respective microsphere diameters of 150 to 700 microns. For microspheres in the size range of 250–300 microns, the percentage of total flow through the tangential inlet was 70%.

To complete the process operation, the gelled microspheres which have collected at the bottom of the column are separated from the organic liquid. Where the process is operated on a continuous basis, this separation may be effected by draining off a portion of the organic liquid and gel microspheres into the product collector and then discharge the product onto a fritted-glass filter thereby draining the solvent off through the fritted glass. If operated batchwise the process may be operated until the section of the sphere-forming column is filled with gelled microspheres, then shut down and the gelled microspheres separated from the organic liquid by use of a fritted-glass filter as before. Then the gel microspheres are dried under mild conditions to remove remaining water and adhering organic liquid. This may conveniently be achieved by supplying heat to the bed of gel microspheres and passing heated gases or superheated steam up through the fritted glass.

The time required for gelation of the sol droplets will, of course, vary depending upon the initial sol molarity and droplet size and in general range from 5 to 20 minutes for 3 M sols. Where, for example, a thoria sol initially 3 M was used to prepare gel microspheres of average particle size of 500 microns, the time required for complete gelation was about 15 minutes.

The gel microspheres, which undergo substantial shrinkage during gelation due to a density increase, have been found to undergo a diameter shrinkage from the gel to the calcined state by a factor of about 1.4. For example, gel microspheres of average particle diameters of about 1000 to 1050 microns undergo shrinkage upon calcination, resulting in final calcined microspheres of from 700–750 microns. This shrinkage should be taken into consideration in the preparation of calcined microspheres of a selected average particle size range.

It should be noted that the organic liquid used to extract the water from the sol droplets to cause gelation forms no part of this invention, except insofar as the requirement that the liquid have moderate solubility for water and a low solubility in water is met. It has generally been found that the long-chained alcohols such as 2-ethyl hexanol or 2-methyl pentanol are quite satisfactory as water removal mediums. It also has been found that a surfactant, such as "Ethomeen S/15" (a tertiary amine) is quite satisfactory in the preparation, for example, of thoria microspheres. For a more complete description of suitable organic solvents and surfactants see copending application S.N. 385,813, in the names of Sam D. Clinton et al., filed on July 28, 1964, now Patent 3,290,122, for "Process for Preparing Oxide Gel Microspheres From Sols." Surfactant concentration of from 0.1 to 0.5 vol. percent in the organic liquid has been found to be quite effective in preventing coalescence or agglomeration of the sol droplets with each other or on the column walls.

The dried microspheres are next fired at an elevated temperature to densify the dried gel microspheres. The firing conditions previously employed for preparation of calcined sol-gel particles may be employed. Where, for example, thorium oxide gel microspheres are to be calcined, this may preferably be carried out at 1150° C. in air for about four hours.

Having thus described the present invention in a general fashion, the following examples are provided to illustrate the quantitative aspects and procedures in greater detail. Example I demonstrates the method and apparatus used to prepare 430 micron thorium oxide microspheres by employing a rotary disperser. Example II demonstrates in similar fashion the preparation of thorium oxide microspheres (380 micron) employing the shear disperser.

Example I

A sphere-forming column was set up generally in accordance with the overall system shown in FIG. 1 and employed a rotary disperser head as shown in FIG. 2. The tapered column, which had a 13 liter capacity, was 40 inches high and tapered from a 2 inch I.D. at the bottom to a 3 inch I.D. at the top. The column had a 6 inch diameter disengagement chamber at the top and a 3 inch diameter enlarged section at the bottom. A rotary dispersing head substantially as shown in FIG. 2 was disposed at the top of the tapered column with its lower extremity extending downward into the organic liquid. The dispersing head comprised a hollow, T-shaped housing which contained eight, equally-spaced holes (0.016 in. diameter) in its surface of maximum diameter (1.5 in.) and an integral axial shaft connected to a variable speed motor for rotation of the housing.

A 3.05 M thorium oxide sol (805 gms. ThO$_2$/liter) was introduced into the housing through a metered syringe pump at a flow rate of 9.6 cc./min. The dispersing head was rotated about its major axis at a tangential speed, measured at the orifices, of 1.8 ft./sec. The organic liquid consisting of 2-ethyl hexanol containing 0.1 volume percent of the surface-active agent "Ethomeen S/15," was introduced through separate metered lines into the enlarged section at the bottom of the column and circulated up flow through the column. The organic liquid was passed tangentially through one line at a flow rate of 1.5 g.p.m. and radially through the other line at a flow rate of 1.0 g.p.m., giving a total organic liquid flow rate of 2.5 g.p.m.

Sol droplets were formed by shearing off the sol stream as it emerged from the multiple orifices which were disposed at a right angle to the rotational axis of the dispersing head and were suspended by the up flowing organic liquid for a period of 15 minutes before they settled. The gel microspheres were removed, dried in air at 120° C. and subsequently fired in air at 1150° C.

The fired product, 880 gms., had an average particle size of 430 microns, with the following size distribution: 9.0 wt. percent, 500–590$\mu$; 47.8 wt. percent, 420–500$\mu$; 35.8 wt. percent, 350–420$\mu$; 7.4 wt. percent, 297–350$\mu$.

Example II

Apparatus substantially as shown in FIG. 1 was set up employing a shear disperser as shown in FIG. 3. The shear disperser contained eight equally-spaced 0.016 in. diameter holes in a ¼ in. O.D. center tube which was in turn centered within a ⅜ in. I.D. glass tube.

For this experiment a 3.40 M thoria sol was passed to the disperser at a flow rate of 9.6 cc./min. and the organic drive-fluid consisting of 2-ethyl hexanol containing 0.5 volume percent of "Ethomeen S/15," was passed to the disperser at a flow rate of 220 cc./min. The fluidizing flows, consisting of 2-ethyl hexanol containing 0.1 volume percent of "Ethomeen S/15," were passed tangentially at a flow rate of 1.2 g.p.m. and radially at 1.4 g.p.m. giving a total organic liquid flow rate of 2.6 g.p.m.

Sol droplets were formed by shearing off the emerging sol stream by the flowing organic liquid and carried into the disengagement chamber. The sol droplets were suspended by the upflowing organic liquid for a period of 15 minutes before they settled. The gel microspheres were removed, dried in air at 120° C. and subsequently fired in air at 1150° C.

The fired products, 440 gms., had an average particle size of 380$\mu$ with the following size distribution: 15.6 wt. percent, 420–500$\mu$; 64.5 wt. percent, 350–420$\mu$; 18.3 wt. percent, 297–300$\mu$; 1.6 wt. percent, <297$\mu$.

What is claimed is:

1. In a process for forming gel microspheres from sol droplets which comprises introducnig through an inlet orifice a fine stream of an aqueous sol selected from the group consisting of urania, thoria, plutonia and zirconia into a stream of an organic drying liquid to thereby congeal said dispersed sol droplets into gel microspheres, the improvement which comprises establishing a velocity gradient in said drying liquid immediately adjacent to said orifice to effect a shearing force on said aqueous sol stream, introducing said sol stream at a flow rate of between 10–25 cc./minute into said drying liquid stream at an angle to the direction of flow of said drying liquid stream to effect a high shearing force on said sol stream thereby forming sol droplets of a size of from 200–500 microns within said drying liquid stream by the action of said shearing force on said emerging aqueous sol stream.

2. The process of claim 1 wherein said sol is about 3 M thoria.

3. The process of claim 1 wherein said organic drying liquid is selected from the group consisting of 2-ethyl hexanol and 2-methyl pentanol.

References Cited

UNITED STATES PATENTS

| | | | |
|---|---|---|---|
| 2,299,929 | 10/1942 | Raynolds | 264—8 |
| 2,495,147 | 1/1950 | Street | 264—8 |
| 2,566,567 | 9/1951 | Hutchinson et al. | 18—12 |
| 3,042,970 | 7/1962 | Terenzi | 264—14 |
| 3,208,829 | 9/1965 | Terenzi | 18—12 |
| 3,290,122 | 12/1966 | Clinton et al | 264—.5 |

L. DEWAYNE RUTLEDGE, *Primary Examiner.*